US008247478B2

(12) United States Patent
Terada

(10) Patent No.: US 8,247,478 B2
(45) Date of Patent: Aug. 21, 2012

(54) THERMOPLASTIC RESIN COMPOSITION

(75) Inventor: Toru Terada, Takasago (JP)

(73) Assignee: Kaneka Corporation, Osaka (JP)

( * ) Notice: Subject to any disclaimer, the term of this patent is extended or adjusted under 35 U.S.C. 154(b) by 862 days.

(21) Appl. No.: 12/224,037

(22) PCT Filed: Feb. 7, 2007

(86) PCT No.: PCT/JP2007/052080
§ 371 (c)(1),
(2), (4) Date: Aug. 15, 2008

(87) PCT Pub. No.: WO2007/094208
PCT Pub. Date: Aug. 23, 2007

(65) Prior Publication Data
US 2010/0168331 A1 Jul. 1, 2010

(30) Foreign Application Priority Data
Feb. 16, 2006 (JP) ................................. 2006-039244

(51) Int. Cl.
C08L 5/04 (2006.01)
(52) U.S. Cl. ................. 524/28; 524/23; 524/24; 524/27; 524/31; 524/32; 524/55; 524/504; 524/522; 524/523; 524/527
(58) Field of Classification Search ............... 524/23, 524/28, 31, 32, 35, 55, 522, 523, 24, 27, 524/504, 527
See application file for complete search history.

(56) References Cited

U.S. PATENT DOCUMENTS

| 4,180,529 | A | * | 12/1979 | Hofmann | ........... | 525/85 |
|---|---|---|---|---|---|---|
| 5,612,413 | A | | 3/1997 | Rozkuszka et al. | | |
| 6,066,693 | A | | 5/2000 | Fischer et al. | | |
| 6,204,327 | B1 | | 3/2001 | Takaki et al. | | |
| 6,218,447 | B1 | | 4/2001 | Sugaya et al. | | |
| 6,608,139 | B1 | * | 8/2003 | Guntherberg et al. | ........... | 525/70 |
| 7,396,877 | B2 | * | 7/2008 | Cha et al. | ........... | 525/71 |
| 2004/0014885 | A1 | | 1/2004 | Nakajima et al. | | |
| 2004/0068034 | A1 | | 4/2004 | Takaki et al. | | |
| 2004/0152821 | A1 | | 8/2004 | Saegusa et al. | | |
| 2005/0203247 | A1 | * | 9/2005 | Ahn et al. | ........... | 524/804 |
| 2006/0089462 | A1 | * | 4/2006 | O et al. | ........... | 525/242 |

FOREIGN PATENT DOCUMENTS

| EP | 0 892 015 | 1/1999 |
|---|---|---|
| EP | 0 992 540 | 4/2000 |
| EP | 1 388 549 | 2/2004 |
| EP | 1 834 988 | 9/2007 |
| EP | 1 834 991 | 9/2007 |
| JP | 39-19035 | 9/1964 |
| JP | 42-22541 | 11/1967 |
| JP | 51-28117 | 8/1976 |
| JP | 52-37987 | 3/1977 |
| JP | 2-1763 | 1/1990 |
| JP | 8-100095 | 4/1996 |
| JP | 9-286830 | 11/1997 |
| JP | 2002-363372 | 12/2002 |
| JP | 2003-105151 | 4/2003 |
| JP | 2003-119396 | 4/2003 |
| JP | 2004-238432 | 8/2004 |
| KR | 2004-0062761 | 7/2004 |
| WO | 2006/070591 | 7/2006 |
| WO | 2006/070592 | 7/2006 |

OTHER PUBLICATIONS

Supplementary European Search Report dated Mar. 4, 2010 issued in European Application corresponding to present US Application.
International Preliminary Report on Patentability including translation of PCT Written Opinion dated Aug. 28, 2008 in PCT Application corresponding to present US Application.
International Search Report issued Apr. 24, 2007 in the International (PCT) Application PCT/JP2007/052080 of which the present application is the U.S. National Stage.

* cited by examiner

*Primary Examiner* — Fred M Teskin
*Assistant Examiner* — Marie Reddick
(74) *Attorney, Agent, or Firm* — Wenderoth, Lind & Ponack, L.L.P.

(57) ABSTRACT

A thermoplastic resin composition of the present invention has high impact resistance, not lowering the weather resistance thereof, even though the amount of an impact resistance improver added thereto is small. The thermoplastic resin composition contains 100 parts by weight of (A) a thermoplastic resin and from 0.5 to 20 parts by weight of (B) a graft copolymer, wherein the graft copolymer (B) contains from 70% to 99% by weight of a crosslinked core (b2) prepared through polymerization of a monomer for the core (b2), containing 70% by weight or more of an acrylate, in the presence of from 0.5% to 20% by weight of a non-crosslinked seed (b1) having a weight-average molecular weight of 40,000 or less, and from 0.5% to 10% by weight of a shell (b3) prepared through polymerization of a monomer for the shell (b3) containing 50% by weight or more of a methacrylate, and the thermoplastic composition further contains from 0.01 to 3.0 parts by weight of (C) a water-soluble polymer compound having the property of forming a physical gel, relative to 100 parts by weight of the graft copolymer (B).

10 Claims, No Drawings

THERMOPLASTIC RESIN COMPOSITION

This application is a National Stage Application of International Application No. PCT/JP2007/052080, filed Feb. 7, 2007, which claims priority to Japanese Application No. 2006-039244, filed Feb. 16, 2006.

TECHNICAL FIELD

The present invention relates to a thermoplastic resin composition excellent in weather resistance and impact resistance.

BACKGROUND ART

For improving the impact resistance of a thermoplastic resin, heretofore widely employed is adding thereto a graft copolymer obtained in an emulsion polymerization method or a suspension polymerization method. For example, it is known to incorporate a diene-based or acrylate-based graft copolymer (e.g., see Patent Reference 1).

However, when a diene-based graft copolymer is added to a thermoplastic resin, then the impact resistance could be improved but the weather resistance is poor, and therefore, in case where the produced molded article is used outdoors, it has a drawback in that its impact resistance greatly worsens. Accordingly, as an impact resistance improver for outdoor use, proposed is an alkyl (meth)acrylate-based graft copolymer for improving the weather resistance of the diene-based one and for imparting the impact resistance thereto (e.g., see Patent Reference 2).

In general, as compared with that of a diene-based rubber, the effect of a (meth)acrylate-based rubber for improving impact resistance is small, and therefore, its amount to be added to a thermoplastic resin must be large. However, in the field of improving the impact resistance of a thermoplastic resin, it is desired to reduce as much as possible the amount of the impact resistance improver, graft copolymer to be added, from the viewpoint of the quality and the cost of products; and investigations for improving this point have been made for a long period of time (e.g., see Patent References 3 and 4).

As a method for improving the impact resistance of a vinyl chloride-based resin, disclosed is a technique of adding to the vinyl chloride-based resin, a graft copolymer containing an acrylic rubber composed of a unit derived from butyl acrylate and a unit derived from an alkyl acrylate of which alkyl group has from 8 to 12 carbon atoms (e.g., see Patent Reference 5). According to the method, the impact resistance could be improved; however, for example, in extrusion of the vinyl chloride-based resin composition, there is a problem in that screw motor load is high, and therefore, it is hard to say that the method is a satisfactory method.

On the other hand, various methods are known for improving the effect of graft copolymer to impart impact resistance to a thermoplastic resin; and among them, it is known that a method of improving the quality and the quantity of the rubbery core in a graft copolymer by lowering the glass transition temperature of the rubbery core in the graft copolymer or by increasing the ratio by weight of the rubber core in the graft copolymer is effective for its object. In particular, it is believed that a method of increasing the ratio by weight of the rubbery core in a graft copolymer to at least 90% by weight and, in that condition, lowering the glass transition temperature of the rubbery core may be effective for imparting high-level impact resistance to the resin.

For example, for obtaining an impact resistance improver in which the ratio by weight of the rubbery core of a graft copolymer is high, there is disclosed a technique of making the polymer of the innermost layer have a specific monomer composition and defining the particle size of the impact resistance improver to fall within a specific range (e.g., see Patent Reference 6). According to this method, the ratio by weight of the rubbery core may be increased; however, since the particle size of the impact resistance improver is limited, there is a problem in that the quality degradation except impact resistance is inevitable. For example, it is known that increasing the particle size of a graft copolymer causes degradation of the physical properties such as typically surface gloss of molded articles. In addition, in case where the particle size of a impact resistance improver in a thermoplastic resin is large, it may be effective for increasing the degree of stress concentration; however, at the same time, it is known that there may occur reduction of the degree of stress concentration owing to prolongation of the interparticle distance; and in particular, in case where the number of the parts of the impact resistance improver to be incorporated is small, the influence of the prolongation of the interparticle distance may be great and there is a problem that the impact resistance-improving effect could not be sufficiently obtained.

Further, in case where the above-mentioned method is employed, the particles themselves may be sticky and therefore, when the graft copolymer particles are collected from an emulsion polymerization latex or a suspension polymerization slurry, they may grow to coarse grains or may form lumps. Even though such a resin is incorporated in a thermoplastic resin, a sufficient impact resistance-improving effect could not be obtained, and further, it may cause appearance failure of molded articles. This is because the impact resistance improver that may readily grow to coarse grains or may readily form lumps could not be uniformly mixed when they are added to and blended with a thermoplastic resin, and further even though the coarsened or lumped impact resistance improver particles are incorporated and processed in a thermoplastic resin, they could not be fully dispersed; and the dispersion failure phenomenon is confirmed through electro-microscopic observation of molded articles. Accordingly, for example, in case where a vinyl chloride-based resin is used as a thermoplastic resin, generally carried out is a step of removing the coarsened or lumped particles by sieving before the impact resistance improver is added thereto and processed.

Therefore, in industrial practice, an impact resistance improver from which coarsened grains are previously removed is used, and it is advantageous in view of the cost thereof to reduce as much as possible the amount of the coarse grains in producing the impact resistance improver; and accordingly, it is said indispensable to restrict the glass transition temperature of the soft polymer phase in a graft copolymer and to restrict the ratio by weight of the soft polymer phase in a graft copolymer.

On the other hand, as a method for collecting a sticky rubbery polymer latex as a poorly-sticky resin powder, there is known a method comprising adding a high-molecular-weight polyanion having carboxyl groups and/or hydroxyl groups in the molecule to a rubber latex, and dropwise adding the mixed latex to an aqueous solution containing at least one alkaline earth metal (e.g., see Patent Reference 7).

According to the method, however, it is said that the high-molecular-weight polyanion must be added in an amount of at least from 2 to 8 parts by weight, preferably from 4 to 6 parts by weight relative to 100 parts by weight of the solid rubber content of the rubber latex, and if not, the stickiness of the collected resin powder could not be prevented. In general, when an impurity (in this case, high-molecular-weight polyanion) in an amount of 4 parts by weight or more is added to a polymer latex, then it may be easily anticipated that the intrinsic quality of a collected polymer composition itself that is used for various purposes may worsen. In particular, in case where the technique is applied to a graft copolymer, of which the amount to be added to a thermoplastic resin and the like for the purpose of imparting impact resistance thereto is desired to be reduced, it is inevitable to worsen the quality such as the impact resistance-imparting effect thereof, and therefore, it is hard to say that the method is a satisfactory method.

In other words, the current situation is that it is continued to expect the development of a thermoplastic resin composition capable of satisfying at a high level, the contradictory requirements of both the improvement of impact resistance and the suppression of processability and quality degradation and cost increase owing to the addition of an impact resistance improver.

Patent Reference 1: Japanese Examined Patent Publication No. 39-19035
Patent Reference 2: Japanese Examined Patent Publication No. 51-28117
Patent Reference 3: Japanese Examined Patent Publication No. 42-22541
Patent Reference 4: Japanese Patent Laid-open Publication No. 2-1763
Patent Reference 5: Japanese Patent Laid-open Publication No. 8-100095
Patent Reference 6: Korean Patent Laid-open Publication No. 2004-62761 (A)
Patent Reference 7: Japanese Patent Laid-open Publication No. 52-37987

DISCLOSURE OF THE PRESENT INVENTION

Problems that the Present Invention is to Solve

A subject matter of the present invention is provide a novel thermoplastic resin composition which, even though the amount of the impact resistance improver added thereto is small, can express high-level impact resistance not lowering the weather resistance thereof and which has good processability.

Means for Solving the Problems

In consideration of the above-mentioned current situation, the present inventor has assiduously studied for the purpose of obtaining a thermoplastic resin composition that has an extremely high-level impact resistance-improving effect while retaining the other quality than the impact resistance and, as a result, has found that, when a graft copolymer (B) comprising a specific non-crosslinked seed (b1), a specific core (b2) and a specific shell (b3) and a water-soluble polymer compound (C) having the property of forming a physical gel are incorporated in a thermoplastic resin, then even though the amount of the impact resistance improver added is small, the thermoplastic resin composition capable of expressing high-level impact resistance can be obtained not lowering the weather resistance thereof, and thus has completed the present invention.

Specifically, the present invention relates to a thermoplastic resin composition containing 100 parts by weight of (A) a thermoplastic resin and from 0.5 to 20 parts by weight of (B) a graft copolymer, wherein the graft copolymer (B) contains from 70% to 99% by weight of a crosslinked core (b2) prepared through polymerization of a monomer for the core (b2), containing 70% by weight or more of an acrylate, in the presence of from 0.5% to 20% by weight of a non-crosslinked seed (b1) having a weight-average molecular weight of 40,000 or less, and from 0.5% to 10% by weight of a shell (b3) prepared through polymerization of a monomer for the shell (b3) containing 50% by weight or more of a methacrylate, and the thermoplastic composition further contains from 0.01 to 3.0 parts by weight of (C) a water-soluble polymer compound having the property of forming a physical gel, relative to 100 parts by weight of the graft copolymer (B).

A preferred embodiment is to provide the thermoplastic resin composition wherein the non-crosslinked seed (b1) is prepared through polymerization of a monomer mixture for the seed (b1) containing from 15% to 98% by weight of (b1-1) at least one monomer selected from a group of an acrylate with an alkyl group having from 2 to 8 carbon atoms, and a methacrylate with an alkyl group having from 1 to 4 carbon atoms, from 0% to 83% by weight of (b1-2) at least one monomer selected from a group of an aromatic vinyl monomer, a vinyl cyanide, an acrylate with an alkyl group having 9 carbon atoms or more and a methacrylate with an alkyl group having 5 carbon atoms or more, and from 2% to 25% by weight of (b1-3) a chain transfer agent.

A preferred embodiment is to provide the thermoplastic resin composition wherein the monomer for the core (b2) is a mixture containing from 70% to 99.9% by weight of an acrylate with an alkyl group having from 2 to 8 carbon atoms, from 0.1% to 5% by weight of a polyfunctional monomer, and from 0% to 29.9% by weight of a monomer copolymerizable with the acrylate with an alkyl group having from 2 to 8 carbon atoms and the polyfunctional monomer, and the volume-average particle size of the crosslinked core (b2) is from 0.05 to 0.3 μm.

A preferred embodiment is to provide the thermoplastic resin composition wherein the monomer for the shell (b3) is a monomer containing from 50% to 100% by weight of a methacrylate with an alkyl group having from 1 to 4 carbon atoms, and from 0% to 50% by weight of a monomer copolymerizable with the methacrylate with an alkyl group having from 1 to 4 carbon atoms.

A preferred embodiment is to provide the thermoplastic resin composition wherein the water-soluble polymer compound (C) having the property of forming a physical gel is one or more selected from hydroxyethylmethyl cellulose, hydroxypropylmethyl cellulose, carboxymethyl cellulose, water-soluble alginic acid derivatives, agar, gelatin, carrageenan, glucomannan, pectin, curdlan, Gellan gum, and polyacrylic acid derivatives.

A preferred embodiment is to provide the thermoplastic resin composition wherein the water-soluble polymer compound (C) having the property of forming a physical gel is a water-soluble alginic acid derivative(s).

A preferred embodiment is to provide the thermoplastic resin composition wherein the proportion of the shell (b3) in the graft copolymer (B) is from 0.5% to 7% by weight.

A preferred embodiment is to provide the thermoplastic resin composition wherein the proportion of the shell (b3) in the graft copolymer (B) is from 0.5% to 4% by weight.

A preferred embodiment is to provide the thermoplastic resin composition which contains from 0.5 to 10 parts by weight of the graft copolymer (B).

A preferred embodiment is to provide the thermoplastic resin composition wherein the thermoplastic resin (A) is a vinyl chloride-based resin.

ADVANTAGE OF THE PRESENT INVENTION

The thermoplastic resin composition of the present invention may express high impact resistance and good processability not lowering the weather resistance, even when the amount of the impact resistance improver incorporated therein is small.

BEST MODE FOR CARRYING OUT THE PRESENT INVENTION

The graft copolymer (B) in the present invention has a multilayer structure of a specific composition, for which, for example, usable is a graft copolymer produced according to an emulsion polymerization method, a suspension polymerization method, a microsuspension polymerization method, a miniemulsion polymerization method or an aqueous dispersion polymerization method. Above all, favorably used is a graft copolymer produced according to an emulsion polymerization method or a suspension polymerization method as its structure control is easy.

Not specifically limited, the non-crosslinked seed (b1) in the graft copolymer (B) may be any non-crosslinked polymer having a weight-average molecular weight of 40,000 or less; however, from the viewpoint of the quality such as typically the impact resistance of the thermoplastic resin composition to be obtained, for example, preferred is one produced through polymerization of a mixture comprising from 15% to 98% by weight of (b1-1) at least one monomer selected from a group of an acrylate with an alkyl group having from 2 to 8 carbon atoms, and a methacrylate with an alkyl group having from 1 to 4 carbon atoms, from 0% to 83% by weight of (b1-2) at least one monomer selected from a group of an aromatic vinyl monomer, a vinyl cyanide, an acrylate with an alkyl group having 9 carbon atoms or more and a methacrylate with an alkyl group having 5 carbon atoms or more, and from 2% to 25% by weight of a chain transfer agent (b1-3). More preferred is one produced through polymerization of a mixture comprising from 20% to 87% by weight of the above (b1-1), from 15% to 72% by weight of the above (b1-2) and from 8% to 25% by weight of the chain transfer agent (b1-3).

Preferably, the non-crosslinked seed (b1) has a weight-average molecular weight of 40,000 or less, more preferably 20,000 or less, even more preferably 10,000 or less. Not specifically limited, the lowermost limit of the weight-average molecular weight of the non-crosslinked seed (b1) is preferably 500 or more, more preferably 800 or more. In case where the weight-average molecular weight of the non-crosslinked seed (b1) in the graft copolymer (B) is more than 40,000, the impact resistance-improving effect could hardly be expressed. The weight-average molecular weight may be measured, for example, through gel permeation chromatography with HLC-8120 (available from Tosoh Corporation).

Also preferably, the non-crosslinked seed (b1) has a volume-average particle size of from 0.005 to 0.08 μm, more preferably from 0.01 to 0.05 μm. In case where the volume-average particle size of the non-crosslinked seed (b1) in the graft copolymer (B) is smaller than 0.005 μm or larger than 0.08 μm, the impact resistance-improving effect could hardly be expressed. The volume-average particle size may be measured, for example, with MICROTRAC UPA150 (available from Nikkiso Co., Ltd.).

Not specifically limited, the polymer of the crosslinked core (b2) in the graft copolymer (B) may be any acrylate-based soft polymer obtained through polymerization of a monomer that contains 70% by weight or more of an acrylate; however, from the viewpoint of the quality such as typically the impact resistance of the thermoplastic resin composition to be obtained, for example, preferred is one produced through polymerization of a mixture of from 70% to 99.9% by weight of an acrylate with an alkyl group having from 2 to 8 carbon atoms, from 0.1% to 5% by weight of a polyfunctional monomer, and from 0% to 29.9% by weight of a monomer copolymerizable with the acrylate with an alkyl group having from 2 to 8 carbon atoms and the polyfunctional monomer.

Further, from the viewpoint of the quality such as typically the impact resistance, the polymer of the core (b2) is preferably such that the particles of the core (b2) obtained through polymerization of the above-mentioned monomer in the presence of the non-crosslinked seed (b1) have a volume-average particle size of from 0.05 μm to 0.3 μm, more preferably from 0.08 μm to 0.25 μm.

Not specifically limited, the core (b2) particles in the graft copolymer (B) in the present invention may be any one having a structure of the non-crosslinked seed (b1) inside it; however, the core (b2) may preferably be used, even if it has a multilayer structure made of a soft polymer or a structure having one or more hard polymer layers in a soft polymer. Further, the structure of the particles of seed (b1)+core (b2) is not specifically defined; however, from the viewpoint of improving the impact resistance to a high level, for example, it is desirable that the particles of seed (b1)+core (b2) may form a structure capable of having pores inside it in an aqueous medium. The porosity of the particles of seed (b1)+core (b2) in an aqueous medium is, from the viewpoint of improving the impact resistance to a high level, preferably from 3% to 90% as the volume fraction in the particles, more preferably from 10% to 60%.

In the present invention, the above-mentioned "soft" means that the glass transition temperature of the polymer is lower than 20° C.; however, from the viewpoint mentioned below, the glass transition temperature of the polymer is preferably lower than 0° C., more preferably lower than −20° C. In case where the glass transition temperature of the polymer of the core (b2) is 20° C. or higher, and when the graft copolymer in the present invention is mixed with a thermoplastic resin such as typically a vinyl chloride-based resin, then the impact-absorbing potency of the core may lower and a remarkable impact resistance-improving effect could hardly be obtained.

The glass transition temperature of the polymer can be measured, for example, with a differential scanning calorimeter; however, in the present invention, there is used the value calculated by Fox formula using the data described in Polymer Handbook (J. Brandrup, Interscience 1989) (e.g., polymethyl methacrylate, 105° C.; and polybutyl acrylate, −54° C.)

The shell (b3) in the graft copolymer (B) is not specifically limited; however, from the viewpoint of the dispersibility of the graft copolymer (B) in the thermoplastic resin (A), for example, it is preferably a polymer produced through polymerization of a monomer comprising from 50% to 100% by weight of a methacrylate with an alkyl group having from 1 to 4 carbon atoms, and from 0% to 50% by weight of a monomer copolymerizable with the methacrylate with an alkyl group having from 1 to 4 carbon atoms.

Not specifically limited, the structure of the shell (b3) in the graft copolymer (B) in the present invention may be any one having a hard polymer layer in the outermost part of the shell; however, the shell (b3) may preferably be used even if it has a multilayer structure made of a hard polymer or a structure having one or more soft polymer layers in a hard polymer.

The above-mentioned "hard" means that the glass transition temperature of the polymer is 20° C. or higher; however, from the viewpoint mentioned below, the glass transition temperature of the polymer is preferably 30° C. or higher, more preferably 50° C. or higher. In case where the glass transition temperature of the shell (b3) is lower than 20° C., and when the graft copolymer (B) in the present invention is mixed with a thermoplastic resin (A) such as typically a vinyl chloride-based resin, then the compatibility with the thermoplastic resin may lower and a remarkable impact resistance-improving effect could hardly be obtained; and in addition, when the graft copolymer particles are collected, they may be often coarsened or lumped.

In general, the graft copolymer (B) in the present invention has a layer structure in which the core (b2) is completely covered with the shell (b3); however, depending on the ratio by weight of the core and the shell, the amount of the shell may be insufficient for forming the layer structure. In such a case, a complete layer structure is not always needed, but a structure in which a part of the core is coated with the shell, or a structure in which the shell is graft-polymerized with a part of the core can also be favorably used.

A general process for producing the above-mentioned graft copolymer is described in detail, for example, in Japanese Patent Laid-open Publication No. 2002-363372, 2003-119396, 9-286830, to which, however, the present invention should not be limited.

The monomer usable for the graft copolymer (B) in the present invention is, for example, a monomer composition prepared by mixing one or more monomers selected from following monomer groups.

The monomer groups include, for example, the following:
(1) Alkyl acrylates having an alkyl group such as methyl acrylate, ethyl acrylate, butyl acrylate, 2-ethylhexyl acrylate, octyl acrylate, dodecyl acrylate, stearyl acrylate, behenyl acrylate; alkyl acrylates having a hydroxyl group such as 4-hydroxybutyl acrylate; or alkyl acrylates having an alkoxy group,
(2) Alkyl methacrylates having an alkyl group such as methyl methacrylate, ethyl methacrylate, butyl methacrylate, 2-ethylhexyl methacrylate, dodecyl methacrylate, stearyl methacrylate, behenyl methacrylate; alkyl methacrylates having a hydroxyl group such as 2-hydroxyethyl methacrylate; or alkyl methacrylates having an alkoxy group,
(3) vinylarenes such as styrene, α-methylstyrene, monochlorostyrene, dicholorostyrene,
(4) vinylcarboxylic acids such as acrylic acid, methacrylic acid,
(5) vinylcyans such as acrylonitrile, methacrylonitrile,
(6) vinyl halides such as vinyl chloride, vinyl bromide, chloroprene,
(7) vinyl acetate,
(8) alkenes such as ethylene, propylene, butylene, butadiene, isobutylene,
(9) polyfunctional monomers such as allyl methacrylate, diallyl phthalate, triallyl cyanurate, monoethylene glycol dimethacrylate, tetraethylene glycol dimethacrylate, 1,3-butylene glycol dimethacrylate, divinylbenzene, glycidyl methacrylate.

The amount of the polyfunctional monomer (crosslinking agent and/or graft-linking agent) to be used for forming the core (b2) in the graft copolymer (B) in the present invention is, from the viewpoint of improving the impact resistance, preferably from 0.1% to 5% by weight relative to the core (b2), more preferably from 0.1% to 2% by weight. When the amount of the polyfunctional monomer to be used for forming the core (b2) in the graft copolymer (B) is larger than 5% by weight, then the impact resistance-improving effect has a tendency to be hardly exhibited. On the other hand, when the amount of the polyfunctional monomer to be used for forming the core (b2) in the graft copolymer (B) is less than 0.1% by weight, then there is a possibility that the impact resistance improver could not retain its form during molding and the impact resistance-improving effect has a tendency to be hardly exhibited.

The ratio by weight of (core+seed)/shell in the graft copolymer (B) in the present invention is not specifically limited; however, the proportion of the shell (b3) in the graft copolymer (B) is preferably from 0.5% to 10% by weight, more preferably from 0.5% to 7% by weight, even more preferably from 0.5% to 4% by weight. In case where the ratio by weight of the shell (b3) in the graft copolymer (B) is more than 10% by weight, the impact resistance-improving effect has a tendency to be poor. On the other hand, in case where the ratio by weight of the shell (b3) in the graft copolymer (B) is less than 0.5% by weight, and for example, when it is used as an impact resistance improver for a thermoplastic resin such as a vinyl chloride-based resin, then the compatibility between the graft copolymer (B) and the thermoplastic resin (A) worsens and therefore the impact resistance-improving effect has a tendency to be hardly obtained.

The composition of the present invention may contains a water-soluble polymer compound (C) having the property of forming a physical gel, along with the graft copolymer (B) for a thermoplastic resin therein. In this, the physical gel means a physically-crosslinked gel to be formed by interpolymer hydrogen bonding or ionic bonding or chelate formation and the like. The wording "having the property of forming a physical gel" means that, when a gelling agent such as an inorganic salt or an acid is added to an aqueous solution of a water-soluble polymer compound alone, then a change from a viscous fluid (sol) to an elastic matter (gel) is visually confirmed; and in the present invention, the water-soluble polymer compound (C) having the property of forming a physical gel is defined as a water-soluble polymer having the above-mentioned property.

Not specifically limited, the water-soluble polymer compound having the property of forming a physical gel that is usable in the present invention may be any one capable of expressing the above-mentioned property, and for example, a water-soluble polymer compound comprising a mixture of one or more selected from the following groups may be used. For example, there are mentioned water-soluble alginic acid derivatives such as alginic acid, sodium alginate, potassium alginate, ammonium alginate; and hydroxyethylmethyl cellulose, hydroxypropylmethyl cellulose, carboxymethyl cellulose, agar, gelatin, carrageenan, glucomannan, pectin, curdlan, Gellan gum, and polyacrylic acid derivatives. In the present invention, in the meaning of attaining its object, more preferred of these are carboxymethyl cellulose, water-soluble alginic acid derivatives or polyacrylic acid derivatives; and most preferred are water-soluble alginic acid derivatives.

In the above-mentioned water-soluble alginic acid derivatives, the ratio of mannuronic acid and guluronic acid is not specifically limited; however, the proportion of guluronic acid is preferably higher as the physical gel-forming potency has a tendency to be higher, and in general, the proportion of guluronic acid in the water-soluble alginic acid derivatives may be 5% by weight or more, preferably 30% by weight or more. The molecular weight of the water-soluble polymer compound such as typically the above-mentioned water-soluble alginic acid derivatives is not specifically limited; however, from the viewpoint of the liquid transferability in production, the viscosity of the aqueous solution having a concentration of 1.0% by weight, as measured with a B-type viscometer, is preferably from 2 to 22000 mPa·s, more preferably from 2 to 1000 mPa·s.

Regarding the process for adding the water-soluble polymer compound (C) having the property of forming a physical gel in the thermoplastic resin composition of the present invention, an effective mode comprises first incorporating (C) in the graft copolymer (B) and then incorporating this in a thermoplastic resin as an impact resistance improver. In particular, a method of adding the water-soluble polymer compound (C) having the property of forming a physical gel to a latex of the graft copolymer (B) followed by processing it is effective.

The content of the water-soluble polymer compound (C) having the property of forming a physical gel in the present invention is preferably from 0.01 to 3.0 parts by weight relative to 100 parts by weight of the graft copolymer (B), more preferably from 0.05 to 1.8 parts by weight. Incase where the content of the water-soluble polymer compound (C) having the property of forming a physical gel is less than 0.01 parts by weight, the graft copolymer to be an impact resistance improver has a tendency to be easily coarsened or lumped when collected; and the existence of the coarsened or lumped graft copolymer, if any, has a tendency to worsen the impact resistance-improving effect. On the contrary, when the content of the water-soluble polymer compound (C) having the property of forming a physical gel is more than 3.0 parts by weight, then the effect of preventing the graft copolymer from being coarsened or lumped in its collection may be improved, but a large quantity of the water-soluble polymer compound (including the substance derived from it) may remain in the impact resistance improver therefore the impact resistance-imparting effect and the quality such as the thermal stability in mold processing has a tendency to be lowered.

In the present invention, a gelling agent is preferably used together with the water-soluble polymer compound (C) having the property of forming a physical gel. More concretely, for example, when the graft copolymer (B) is collected from the latex, the gelling agent is preferably added to the mixture of the latex of the graft copolymer and the water-soluble polymer compound (C) having the property of forming a physical gel.

The gelling agent usable in the present invention includes, for example, inorganic salts such as sodium chloride, potassium chloride, lithium chloride, sodium bromide, potassium bromide, lithium bromide, potassium iodide, lithium iodide, potassium sulfate, ammonium sulfate, sodium sulfate, ammonium chloride, sodium nitrate, potassium nitrate, calcium chloride, ferrous sulfate, magnesium sulfate, zinc sulfate, copper sulfate, cadmium sulfate, barium chloride, ferrous chloride, magnesium chloride, ferric chloride, ferric sulfate, aluminium sulfate, potassium alum and iron alum; inorganic acids such as hydrochloric acid, sulfuric acid, nitric acid and phosphoric acid; organic acids such as acetic acid and formic acid; and salts of organic acids such as sodium acetate, calcium acetate, sodium formate and calcium formate. One or more of these can be used either singly or as combined.

Of those, preferably used are inorganic salts such as sodium chloride, potassium chloride, ammonium sulfate, sodium sulfate, ammonium chloride, calcium chloride, ferrous sulfate, magnesium sulfate, zinc sulfate, copper sulfate, cadmium sulfate, barium chloride, ferrous chloride, magnesium chloride, ferric chloride, ferric sulfate, aluminium sulfate, potassium alum and iron alum; inorganic acids such as hydrochloric acid, sulfuric acid, nitric acid and phosphoric acid; organic acids such as acetic acid and formic acid, either as a single substance or as a mixture of two or more of them.

In the present invention, in case where a water-soluble alginic acid derivative is used as the water-soluble polymer compound (C) having the property of forming a physical gel, calcium chloride, ferrous sulfate, ferrous chloride, ferric chloride, ferrous sulfate, aluminium sulfate and the like is favorably used as the gelling agent.

The amount of the gelling agent to be added is not specifically limited; however, most of the gelling agent can be washed away in the rinsing step in collection of the graft copolymer, and it is desirable that the gelling agent remains in an amount of less than 1 part by weight relative to 100 parts by weight of the graft copolymer (B), more preferably from 0.01 to 0.5 parts by weight. In case where the amount of the remaining gelling agent is more than 1 part by weight relative to 100 parts by weight of the graft copolymer (B), and, for example, the processability when the copolymer is incorporated in a thermoplastic resin such as a vinyl chloride-base resin, or molded may change, and not only a high impact-resistant effect has a tendency to be hardly exhibited but also there may occur a problem of yellowing of molded articles.

The amount of the gelling agent to be used in collection of the graft copolymer (B) is not specifically limited, so far as the residual amount of the gelling agent could be less than 1 part by weight relative to 100 parts by weight of the graft copolymer (B); however, from the viewpoint of the easiness in collection and of the production cost, the amount is preferably from 0.2 to 20 parts by weight relative to the graft copolymer (B), more preferably from 1 to 10 parts by weight.

In the present invention, the object of incorporating the water-soluble polymer compound (C) having the property of forming a physical gel, preferably along with the gelling agent, in the thermoplastic resin composition of the present invention, or in the impact resistance improver containing the graft copolymer (B) and the water-soluble polymer compound (C) having the property of forming a physical gel is, (1) for improving the anti-blocking property of the coagulated particles of the graft copolymer (B) during their collection and for improving the morphology retentiveness of the coagulated particles (for imparting elasticity to the coagulated particles) owing to the coexistence of the non-sticky physical gel in the coagulated particles of the graft copolymer (B), and (2) even after the coagulated particles of the graft copolymer (B) are dried, the dried non-sticky physical gel may coexist in the coagulated particles, and therefore the anti-blocking property of the coagulated particles and the morphology retentiveness of the coagulated particles (for imparting elasticity to the coagulated particles) may be improved and the particles may be thereby prevented from being coarsened or lumped.

In addition, a anti-caking agent can be added to the graft copolymer (B) in the present invention. The anti-caking agent usable in the present invention is not specifically limited; however, as capable of satisfying the quality such as the impact resistance-improving effect and the effect of inhibiting the particles from being coarsened and lumped, at a high level, for example, favorably used are polyvalent metal salts of anionic surfactants and/or silicone oils.

As the thermoplastic resin (A) in the present invention, for example, favorably used are vinyl chloride-based resins, (meth)acrylic resins, styrenic resins, carbonate resins, amide resins, ester resins, olefinic resins, and the like. However, the resin should not be limited to these.

Above all, especially preferred is vinyl chloride-based resins, because when the graft copolymer (B) in the present invention is used as an impact resistance improver for vinyl chloride-based resins, it can exhibit an excellent effect. The vinyl chloride-based resins in the present invention is meant to indicate a vinyl chloride homopolymer, or copolymers containing a unit derived from vinyl chloride in an amount of at least 70% by weight.

The thermoplastic resin composition of the present invention comprises the graft copolymer (B) capable of expressing excellent impact resistance even when the amount thereof in the composition is small, and therefore, the composition can attain the balance of excellent physical properties and cost that has heretofore been hardly attained. Not specifically limited, the content of the graft copolymer (B) in the thermoplastic resin composition is, from the viewpoint of the quality and the cost of the composition, preferably from 0.5 to 20 parts by weight relative to 100 parts by weight of the thermoplastic resin (A) therein, more preferably from 0.5 to 10 parts by weight, even more preferably from 1 to 6.5 parts by weight, most preferably from 1.5 to 5.5 parts by weight. In case where the content of the graft copolymer (B) is more than 20 parts by weight relative to 100 parts by weight of the thermoplastic resin (A), the impact resistance-improving effect may be sufficient, but the quality except the impact resistance may worsen and the cost may increase. On the other hand, when the content of the graft copolymer (B) is less than 0.5 parts by weight relative to 100 parts by weight of the thermoplastic resin (A), then a sufficient impact resistance-improving effect could not be obtained.

If desired, additives such as antioxidant, heat stabilizer, UV absorbent, pigment, antistatic agent, lubricant and processing aid may be suitably added to the thermoplastic resin composition of the present invention.

Not specifically limited, any known method may be employed for producing the thermoplastic resin composition of the present invention. For example, herein employed is a process for producing a resin composition by previously mixing a thermoplastic resin(s) (A), a graft copolymer(s) (B) and a water-soluble polymer compound(s) (C) having the property of forming a physical gel with a Henschel mixer, a tumbler and the like, and then melt-kneading the mixture with a single-screw extruder, a twin-screw extruder, a Banbury mixer, a hot roll and the like.

EXAMPLES

The present invention is described in more detail with reference to the following Examples; however, the present invention should not be limited to these Examples.

Example 1

Formation of Graft Copolymer X

<Preparation of Seed (b1)>

350 parts by weight of deionized water and 5 parts by weight of sodium oleate were fed into a glass reactor having a thermometer, a stirrer, a reflux condenser, a nitrogen-introducing port, a device for monomer addition and a device for emulsifier addition, and then heated up to 50° C. with stirring in a nitrogen flow. Next, via the device for addition, a mixture of 3.85 parts by weight of butyl acrylate (hereinafter this may be referred to as BA), 3.85 parts by weight of styrene (hereinafter this may be referred to as ST), and 2.30 parts by weight of a chain transfer agent, t-dodecylmercaptan (hereinafter this may be referred to as TDM), which were a part of a monomer mixture for seed (b1), and 0.02 parts by weight of cumene hydroperoxide were fed into it; and after 10 minutes, a mixture liquid prepared by dissolving 0.01 parts by weight of disodium salt of ethylenediaminetetraacetic acid and 0.005 parts by weight of ferrous sulfate 7-hydrate in 5 parts by weight of distilled water, and 0.2 parts by weight of sodium formaldehyde sulfoxylate were fed into it. In that condition, this was stirred for 1 hour, and then a mixture of 34.65 parts by weight of BA, 34.65 parts by weight of ST and 20.70 parts by weight of TDM, which were a mixture of the remaining part of the monomer mixture for seed (b1), and 0.15 parts by weight of cumene hydroperoxide was dropwise added to it, taking 5 hours. Simultaneously with the dropwise addition of the mixture, 1 part by weight of sodium laurylsulfate was, as its aqueous solution having a concentration of 5% by weight, continuously added thereto, also taking 5 hours; and afterwards, this was further kept stirred for 1.5 hours, thereby obtaining a latex of a non-crosslinked seed (b1) having a volume-average particle size, as measured with MICROTRAC UPA150 (available from Nikkiso Co., Ltd.), of 0.04 µm. The weight-average molecular weight of the polymer, as measured through gel permeation chromatography with HLC-8120 (available from Tosoh Corporation), was 1,700.

<Preparation of Crosslinked Core (b2)>

Next, 200 parts by weight of deionized water, 2 parts by weight (as polymer solid content) of the above latex of non-crosslinked seed (b1), 0.15 parts by weight of sodium laurylsulfate, and 0.4 parts by weight of potassium persulfate were fed into a glass reactor having a thermometer, a stirrer, a reflux condenser, a nitrogen-introducing port, a device for monomer addition and a device for emulsifier addition, then heated up to 50° C. with stirring in a nitrogen flow, and further, a monomer mixture for core (b2) of 89.50 parts by weight of BA and 0.50 parts by weight of allyl methacrylate (hereinafter this may be referred to as AMA) was dropwise added thereto, taking 5 hours. Simultaneously with the dropwise addition of the monomer mixture for core (b2), 1 part by weight of sodium laurylsulfate was, as its aqueous solution having a concentration of 5% by weight, continuously added thereto, also taking 5 hours. Afterwards, this was further kept stirred for 3 hours, thereby obtaining a latex of a crosslinked core (b2). The glass transition temperature (hereinafter this may be referred to as Tg) of the core (b2) was −54° C.; and the volume-average particle size, as measured with MICROTRAC UPA150 (available from Nikkiso Co., Ltd.), of the seed (b1)-containing crosslinked core (b2) was 0.16 µm.

<Preparation of Shell (b3)>

To the latex of the polymerized core (b2), added were a mixture liquid prepared by dissolving 0.01 parts by weight of disodium salt of ethylenediaminetetraacetic acid and 0.005 parts by weight of ferrous sulfate 7-hydrate dissolved in 5 parts by weight of distilled water, and 0.2 parts by weight of sodium formaldehyde sulfoxylate, and further, a mixture of 8.0 parts by weight of a monomer for shell (b3), methyl methacrylate (hereinafter this may be referred to as MMA) and 0.01 parts by weight of cumene hydroperoxide was continuously added thereto, taking 30 minutes. After the addition of the mixture, 0.01 parts by weight of cumene hydroperoxide was added, and this was further stirred for 1 hour to complete the polymerization. In this stage, the conversion of the monomer component in polymerization was 99.2%. According to the above, a latex of a graft copolymer X was obtained, comprising 92% by weight as a whole of the crosslinked core of the seed (b1) and the core (b2), and 8% by weight of the shell (b3) of a hard polymer (Tg: 105° C.).

<Preparation of White Resin Powder of Graft Copolymer X>

First, to the latex of graft copolymer X (polymer solid content, 100 parts by weight), added was an aqueous solution of sodium alginate (Kimica's Algitex LL) having a concentration of 1.5% by weight in such a manner that the solid content of sodium alginate could be 0.4 parts by weight relative to 100 parts by weight of the graft copolymer X, then stirred for 3 minutes to produce a mixed latex of graft copolymer X. The viscosity at room temperature of the aqueous sodium alginate solution having a concentration of 1.5% by weight, as measured with a B-type viscometer, was 120 m·Pa·s.

Next, the mixed latex of graft copolymer X at a temperature of 20° C. was, using a swirler-type conical nozzle (nozzle diameter, 0.6 mm), a type of pressure nozzle, sprayed under a spraying pressure of 3.7 kg/cm$^2$ to give droplets having a volume-average droplet diameter of about 200 µm, at the position of a height of 5 m from the liquid level at the tower bottom in a cylindrical device having a diameter of 60 cm. Simultaneously with this, an aqueous solution of calcium chloride having a concentration of 30% by weight was, while mixed with air through a two-fluid nozzle, sprayed onto it in such a manner that the calcium chloride solid content could be from 5 to 15 parts by weight relative to 100 parts by weight of the graft copolymer X and that the formed liquid droplets could be from 0.1 to 10 µm in size. The mixed latex droplets of the graft copolymer X were collected in a receiver tank filled with an aqueous solution of calcium chloride having a concentration of 1.0% by weight, at 30° C., as an aqueous solution containing the coagulated latex particles.

Finally, to the obtained aqueous solution containing the coagulated latex particles, added was an aqueous solution of potassium palmitate having a concentration of 5% by weight, in such a manner that the solid content of potassium palmitate could be 1.5 parts by weight relative to 100 parts by weight of the solid content of the graft copolymer X, and then this was heated, dewatered and dried to prepare a white resin powder of the graft copolymer X.

Comparative Example 1

A white resin powder was prepared according to the same process as in Example 1, for which, however, the latex of graft copolymer X was used but sodium alginate was not added to the latex.

Table 1 shows the composition (part by weight) of the graft copolymer obtained in Example and Comparative Example, Tg of the polymers of the core (b2) and the shell (b3), the type and the amount of the water-soluble polymer compound (C) having the property of forming a physical gel, and the powder yield.

The powder yield as referred to herein indicates the yield of the white resin powder of the graft copolymer that had passed through a 16-mesh sieve in fractionation. It was judged that the graft copolymer not passing through the sieve was coarsened or lumped.

TABLE 1

|  |  | Example 1 | Comparative Example 1 |
|---|---|---|---|
| Seed (b1) | monomer 1 | ST 0.77 | ST 0.77 |
|  | monomer 2 | BA 0.77 | BA 0.77 |
|  | chain transfer agent | TDM 0.46 | TDM 0.46 |
|  | polyfunctional monomer | no | no |
|  | weight-average molecular weight | 1,700 | 1,700 |
| Core (b2) | composition | BA 89.50 | BA 89.50 |
|  |  | AMA 0.50 | AMA 0.50 |
|  | Tg (° C.) | −54 | −54 |
|  | particle size (µm) | 0.16 | 0.16 |
| Shell (b3) | composition | MMA 8.00 | MMA 8.00 |
|  | Tg (° C.) | 105 | 105 |
| Water-Soluble Polymer Compound (C) | type | sodium alginate | no |
|  | amount (wt. %) | 0.4 | — |
| Powder Yield (%) |  | 100 | 53 |

Comparing Example 1 with Comparative Example 1, it is known that, in Example 1, the powder yield is significantly increased by adding the water-soluble polymer compound having the property of forming a physical gel to the composition, or that is, in this, a graft copolymer (B) which is neither coarsened nor lumped can be obtained.

Example 2

Formation of Graft Copolymer Y

<Preparation of Seed (b1)>

160 parts by weight of deionized water and 0.05 parts by weight of sodium laurylsulfate were fed into a glass reactor having a thermometer, a stirrer, a reflux condenser, a nitrogen-introducing port, a device for monomer addition and a device for emulsifier addition, and then heated up to 55° C. with stirring in a nitrogen flow. Next, via the device for addition, a mixture of 0.39 parts by weight of BA, 0.39 parts by weight of ST, and 0.22 parts by weight of a chain transfer agent, TDM, which were a monomer mixture for seed (b1), and 0.02 parts by weight of cumene hydroperoxide were fed into it; and after 10 minutes, a mixture liquid prepared by dissolving 0.001 parts by weight of disodium salt of ethylenediaminetetraacetic acid and 0.0005 parts by weight of ferrous sulfate 7-hydrate in 5 parts by weight of distilled water, and 0.07 parts by weight of sodium formaldehyde sulfoxylate were fed into it. In that condition, this was stirred for 1 hour to obtain a latex of a non-crosslinked seed (b1). The weight-average molecular weight of the polymer, as measured through gel permeation chromatography with HLC-8120 (available from Tosoh Corporation), was 3,700.

<Preparation of Crosslinked Core (b2)>

Next, 0.15 parts by weight of sodium laurylsulfate and 0.4 parts by weight of potassium persulfate were fed into the above system that had been stirred for 1 hour, and further, a monomer mixture for core (b2) of 95.50 parts by weight of BA and 0.50 parts by weight of AMA was dropwise added thereto, taking 5 hours. Simultaneously with the dropwise addition of the monomer mixture for core (b2), 1 part by weight of sodium laurylsulfate was, as its aqueous solution having a concentration of 5% by weight, continuously added thereto, also taking 5 hours. Afterwards, this was further kept stirred for 3 hours, thereby obtaining a latex of a crosslinked core (b2). Tg of the core (b2) was −54° C.; and the volume-average particle size, as measured with MICROTRAC UPA150 (available from Nikkiso Co., Ltd.), of the seed (b1)-containing crosslinked core (b2) was 0.19 µm.

<Preparation of Shell (b3)>

To the latex of the polymerized core (b2), added were a mixture liquid prepared by dissolving 0.01 parts by weight of disodium salt of ethylenediaminetetraacetic acid and 0.005 parts by weight of ferrous sulfate 7-hydrate dissolved in 5 parts by weight of distilled water, and 0.2 parts by weight of sodium formaldehyde sulfoxylate, and further, a mixture of 3.0 parts by weight of a monomer for shell (b3), MMA and 0.005 parts by weight of cumene hydroperoxide was continuously added thereto, taking 10 minutes. After the addition of the mixture, 0.01 parts by weight of cumene hydroperoxide was added, and this was further stirred for 1 hour to complete the polymerization. In this stage, the conversion of the monomer component in polymerization was 99.5%. According to the above, a latex of a graft copolymer Y was obtained, comprising 97% by weight as a whole of the crosslinked core of the seed (b1) and the core (b2), and 3% by weight of the shell (b3) of a hard polymer (Tg: 105° C.)

<Preparation of White Resin Powder of Graft Copolymer Y>

First, in the same manner as in the above-mentioned (preparation of white resin powder of graft copolymer X), a mixed latex of graft copolymer Y was produced.

Next, the mixed latex of the graft copolymer Y at a temperature of 5° C. was, in the same manner as in the above-mentioned (preparation of white resin powder of graft copolymer X) and using a swirler-type conical nozzle (nozzle diameter, 0.6 mm), a type of pressure nozzle, sprayed under a spraying pressure of 3.7 kg/cm$^2$ to give droplets having a volume-average droplet diameter of about 200 μm, at the position of a height of 5 m from the liquid level at the tower bottom in a cylindrical device having a diameter of 60 cm; and simultaneously with this, an aqueous solution of calcium chloride having a concentration of 30% by weight was, while mixed with air through a two-fluid nozzle, sprayed onto it in such a manner that the calcium chloride solid content could be from 5 to 15 parts by weight relative to 100 parts by weight of the graft copolymer Y and that the formed liquid droplets could be from 0.1 to 10 μm in size. The mixed latex droplets of the graft copolymer Y were collected in a receiver tank filled with an aqueous solution of calcium chloride having a concentration of 1.0% by weight, at 5° C., as an aqueous solution containing the coagulated latex particles.

Finally, to the obtained aqueous solution containing the coagulated latex particles, added was an aqueous solution of potassium palmitate having a concentration of 5% by weight, in such a manner that the solid content of potassium palmitate could be 1.5 parts by weight relative to 100 parts by weight of the solid content of the graft copolymer Y, and then this was heated, dewatered and dried to prepare a white resin powder of the graft copolymer Y.

(Preparation of Thermoplastic Resin Composition, Preparation of Molded Article, and Evaluation)

100 parts by weight of a vinyl chloride resin (Kanevinyl S-1001, available from Kaneka Corporation, having an average degree of polymerization of 1000), 1.5 parts by weight of a methyltin stabilizer, 1.5 parts by weight of calcium stearate, 1.2 parts by weight of paraffin wax, 10 parts by weight of titanium oxide, 4 parts by weight of calcium carbonate, 1.5 parts by weight of a processing aid of methyl methacrylate-based polymer (methyl methacrylate-based polymer of such that a solution of 0.1 g of the polymer dissolved in 100 ml of chloroform had a specific viscosity of less than 0.5 at 30° C.) (Kaneace PA-20, available from Kaneka Corporation) and 5 parts by weight of the white resin powder of the graft copolymer Y were blended with a Henschel mixer to obtain a powder compound.

The obtained powder compound was used as a starting material. Using a 65 mm parallel twin-screw extruder (available from Battenfeld), and under the molding temperature condition of C1/C2/C3/C4/AD/D1/D2/D3/D4:195/195/193/190/–190/200/200/200/200° C., at the screw rotation number of 17 rpm and at the discharge amount of 85 kg/hour, this was molded into a profile window frame. A part of the thus-obtained, molded window frame was cut into pieces, piled up to have a predetermined thickness, and press-molded into a molded article. From the molded article, test pieces for impact resistance were sampled, and according to JIS K-7110, their Izod strength was measured at a test temperature of 23° C. The Izod strength test result and the motor load in extrusion are shown in Table 2.

Comparative Example 2

According to the same process as in Example 2, a graft copolymer Y', its white resin powder, a thermoplastic resin composition and test pieces were prepared, for which, however, in producing the graft copolymer Y, TDM was removed from the monomer mixture for seed (b1) in Example 2, or that is, 0.39 parts by weight of BA and 0.39 parts by weight of ST were used as the monomer mixture for seed (b1). The Izod strength test result and the motor load in extrusion are shown in Table 2.

The weight-average molecular weight of the polymer of the seed (b1) of the graft copolymer, as measured through gel permeation chromatography with HLC-8120 (available from Tosoh Corporation), was 1,100,000.

Comparative Example 3

According to the same process as in Example 2, a graft copolymer Y", its white resin powder, a thermoplastic resin composition and test pieces were prepared, for which, however, in producing the graft copolymer Y, 0.05 parts by weight of AMA was further added to the monomer mixture for seed (b1) in Example 2, or that is, 0.37 parts by weight of BA, 0.37 parts by weight of ST, 0.21 parts by weight of a chain transfer agent, TDM, and 0.05 parts by weight of AMA were used as the monomer mixture for seed (b1). The Izod strength test result and the motor load in extrusion are shown in Table 2. Since the polymer of seed (b1) of this graft copolymer was crosslinked, its weight-average molecular weight could not be measured.

Comparative Example 4

Formation of Graft Copolymer Z 160 parts by weight of deionized water and 0.05 parts by weight of sodium laurylsulfate were fed into a glass reactor having a thermometer, a stirrer, a reflux condenser, a nitrogen-introducing port, a device for monomer addition and a device for emulsifier addition, and then heated up to 50° C. with stirring in a nitrogen flow. Next, via the device for addition, a mixture of 5.93 parts by weight of BA, 2.51 parts by weight of 2-ethylhexyl acrylate (hereinafter this may be referred to as 2-EHA) and 0.06 parts by weight of AMA, which were a mixture of a part of a monomer mixture for crosslinked core, and 0.01 parts by weight of cumene hydroperoxide was fed into it; and after 10 minutes, a mixture liquid prepared by dissolving 0.01 parts by weight of disodium salt of ethylenediaminetetraacetic acid and 0.005 parts by weight of ferrous sulfate 7-hydrate in 5 parts by weight of distilled water, and 0.2 parts by weight of sodium formaldehyde sulfoxylate were fed into it.

In that condition, this was stirred for 1 hour, and then a mixture of 61.79 parts by weight of BA, 26.09 parts by weight of 2-EHA and 0.62 parts by weight of AMA, which were a mixture of the remaining part of the monomer mixture for crosslinked core, and 0.1 parts by weight of cumene hydroperoxide was dropwise added to it, taking 5 hours. Simultaneously with the dropwise addition of the mixture, 1 part by weight of sodium laurylsulfate was, as its aqueous solution having a concentration of 5% by weight, continuously added thereto, also taking 5 hours. After the addition of the monomer mixture, this was further kept stirred for 1.5 hours, thereby obtaining a latex having Tg of –53° C. and a volume-average particle size of 0.16 μm.

To the latex of the crosslinked core, continuously added was a mixture of a monomer for shell (b3), 3.0 parts by weight of MMA, and 0.01 parts by weight of cumene hydroperoxide, taking 10 minutes. After the addition of the mixture, 0.01 parts by weight of cumene hydroperoxide was further added, and this was stirred further for 1 hour to complete the polymerization. In this stage, the conversion of the monomer component in polymerization was 98.7%. According to the above, a latex of a graft copolymer Z was obtained, having a crosslinked core content of 97% by weight and a shell (b3) content (Tg: 105° C.) of 3% by weight.

According to the same process as in Example 2 except that the graft copolymer Z was used, its white resin powder, a thermoplastic resin composition and test pieces were prepared. The Izod strength test result and the motor load in extrusion are shown in Table 2.

Specifically, Table 2 shows the composition of the graft copolymer obtained in Examples and Comparative Examples, Tg of the polymers of the core (b2) and the shell (b3), the type and the amount of the water-soluble polymer compound (C) having the property of forming a physical gel, the Izod strength and the motor load in extrusion.

TABLE 2

|  |  | Example 2 | Comparative Example 2 | Comparative Example 3 | Comparative Example 4 |
|---|---|---|---|---|---|
| Seed (b1) | monomer 1 | ST 0.39 | ST 0.39 | ST 0.37 | BA 67.72 |
|  | monomer 2 | BA 0.39 | BA 0.39 | BA 0.37 | 2-EHA 28.60 |
|  | chain transfer agent | TDM 0.22 | no | TDM 0.21 | AMA 0.68 |
|  | polyfunctional monomer | no | no | AMA 0.05 |  |
|  | weight-average molecular weight | 3,700 | 1,100,000 | immeasurable |  |
| Core (b2) | composition | BA 95.50 | BA 95.50 | BA 95.50 |  |
|  |  | AMA 0.50 | AMA 0.50 | AMA 0.50 |  |
|  | Tg (° C.) | −54 | −54 | −54 | −53 |
|  | particle size (μm) | 0.19 | 0.18 | 0.20 | 0.16 |
| Shell (b3) | composition | MMA 3.00 | MMA 3.00 | MMA 3.00 | MMA 3.00 |
|  | Tg (° C.) | 105 | 105 | 105 | 105 |
| Water-Soluble Polymer Compound (C) | type | sodium alginate | sodium alginate | sodium alginate | sodium alginate |
|  | amount (wt. %) | 0.4 | 0.4 | 0.4 | 0.4 |
| Izod Strength (kJ/m$^2$) |  | 130 | 87 | 60 | 118 |
| Motor Load (%) |  | 70 | 72 | 70 | 82 |

Comparing Example 2 with Comparative Examples 2 and 3, it is known that, in production of the graft copolymer (B), if the weight-average molecular weight of the seed (b1) is within a predetermined range and if the seed (b1) is not crosslinked, then a high impact resistance-improving effect could be obtained.

Comparing Example 2 with Comparative Example 4, it is known that, if the crosslinked core of the graft copolymer (B) is a polymer having a weight-average molecular weight of 40,000 or less obtained through polymerization with a chain transfer agent and if it is a crosslinked core polymerized in the presence of a non-crosslinked polymer, seed (b1), then it may have a high impact resistance-improving effect and good processability, as compared with a graft copolymer having, as one constitutive element, an acrylic rubber (crosslinked core) that contains a unit derived from butyl acrylate and a unit derived from an alkyl acrylate where alkyl group has from 8 to 12 carbon atoms.

The invention claimed is:

1. A thermoplastic resin composition containing 100 parts by weight of (A) a thermoplastic resin and from 0.5 to 20 parts by weight of (B) a graft copolymer, wherein:
the graft copolymer (B) contains from 70% to 99% by weight of a crosslinked core (b2) prepared through polymerization of a monomer for the core (b2), containing 70% by weight or more of an acrylate, in the presence of from 0.5% to 20% by weight of a non-crosslinked seed (b1) having a weight-average molecular weight of 40,000 or less, and from 0.5% to 10% by weight of a shell (b3) prepared through polymerization of a monomer for the shell (b3) containing 50% by weight or more of a methacrylate,
and the thermoplastic composition further contains from 0.01 to 3.0 parts by weight, relative to 100 parts by weight of the graft copolymer (B), of (C) a water-soluble polymer compound having the property of forming a physical gel.

2. The thermoplastic resin composition according to claim 1, wherein the non-crosslinked seed (b1) is prepared through polymerization of a monomer mixture for the seed (b1) containing from 15% to 98% by weight of (b1-1) at least one monomer selected from the group consisting of an acrylate with an alkyl group having from 2 to 8 carbon atoms, and a methacrylate with an alkyl group having from 1 to 4 carbon atoms, from 0% to 83% by weight of (b1-2) at least one monomer selected from the group consisting of an aromatic vinyl monomer, a vinyl cyanide, an acrylate with an alkyl group having 9 carbon atoms or more and a methacrylate with an alkyl group having 5 carbon atoms or more, and from 2% to 25% by weight of (b1-3) a chain transfer agent.

3. The thermoplastic resin composition according to claim 1, wherein the monomer for the core (b2) is a mixture containing from 70% to 99.9% by weight of an acrylate with an alkyl group having from 2 to 8 carbon atoms, from 0.1% to 5% by weight of a polyfunctional monomer, and from 0% to 29.9% by weight of a monomer copolymerizable with the acrylate with an alkyl group having from 2 to 8 carbon atoms and the polyfunctional monomer, and the volume-average particle size of the crosslinked core (b2) is from 0.05 to 0.3 μm.

4. The thermoplastic resin composition according to claim 1, wherein the monomer for the shell (b3) is a monomer containing from 50% to 100 % by weight of a methacrylate with an alkyl group having from 1 to 4 carbon atoms, and from 0% to 50% by weight of a monomer copolymerizable with the methacrylate with an alkyl group having from 1 to 4 carbon atoms.

5. The thermoplastic resin composition according to claim 1, wherein the water-soluble polymer compound (C) having the property of forming a physical gel is one or more selected from the group consisting of hydroxyethylmethyl cellulose, hydroxypropylmethyl cellulose, carboxymethyl cellulose, alginic acid, sodium alginate, potassium alginate, ammonium alginate, agar, gelatin, carrageenan, glucomannan, pectin, curdlan and Gellan gum.

6. The thermoplastic resin composition according to claim 5, wherein the water-soluble polymer compound (C) having the property of forming a physical gel is alginic acid, sodium alginate, potassium alginate or ammonium alginate.

7. The thermoplastic resin composition according to claim 1, wherein the proportion of the shell (b3) in the graft copolymer (B) is from 0.5% to 7% by weight.

8. The thermoplastic resin composition according to claim 1, wherein the proportion of the shell (b3) in the graft copolymer (B) is from 0.5% to 4% by weight.

9. The thermoplastic resin composition according to claim 1, which contains from 0.5 to 10 parts by weight of the graft copolymer (B).

10. The thermoplastic resin composition according to claim 1, wherein the thermoplastic resin (A) is a vinyl chloride-based resin.

* * * * *